United States Patent
Fitzpatrick et al.

(10) Patent No.: US 12,084,591 B2
(45) Date of Patent: Sep. 10, 2024

(54) THREE-DIMENSIONAL ARTICLES MADE BY ADDITIVE MANUFACTURING HAVING REDUCED SURFACE HAZE

(71) Applicant: Henkel IP & Holding GmbH, Duesseldorf (DE)

(72) Inventors: Darragh Fitzpatrick, Newbridge (IE); David Branagan, Maynooth (IE); Lisa Kennedy, Navan (IE); Rachel Hersee, Drimnagh (IE); Martin Smyth, Kilmainham (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 878 days.

(21) Appl. No.: 17/034,025

(22) Filed: Sep. 28, 2020

(65) Prior Publication Data

US 2021/0009853 A1    Jan. 14, 2021

Related U.S. Application Data

(63) Continuation of application No. PCT/EP2019/056047, filed on Mar. 11, 2019.

(30) Foreign Application Priority Data

Mar. 28, 2018   (GB) ..................... 1805017

(51) Int. Cl.
| | | |
|---|---|---|
| *C09D 175/16* | (2006.01) | |
| *B29C 64/30* | (2017.01) | |
| *B33Y 40/20* | (2020.01) | |
| *B33Y 80/00* | (2015.01) | |
| *C09D 4/06* | (2006.01) | |
| *C09D 5/00* | (2006.01) | |
| *C09D 7/20* | (2018.01) | |
| *C09D 133/08* | (2006.01) | |
| *C09D 133/10* | (2006.01) | |

(52) U.S. Cl.
CPC ............ *C09D 175/16* (2013.01); *B29C 64/30* (2017.08); *B33Y 40/20* (2020.01); *B33Y 80/00* (2014.12); *C09D 4/06* (2013.01); *C09D 5/006* (2013.01); *C09D 7/20* (2018.01); *C09D 133/08* (2013.01); *C09D 133/10* (2013.01)

(58) Field of Classification Search
CPC ........ C09D 175/16; C09D 4/06; C09D 5/006; C09D 7/20; C09D 133/08; C09D 133/10; C09D 4/00; B29C 64/30; B33Y 40/20; B33Y 80/00; B33Y 40/00; B33Y 70/00; G02B 1/10; G02B 1/11
See application file for complete search history.

(56) References Cited

U.S. PATENT DOCUMENTS

| | | |
|---|---|---|
| 9,861,452 B2 | 1/2018 | Rundlett |
| 2009/0286181 A1 | 11/2009 | Sarmah et al. |
| 2017/0113443 A1 | 4/2017 | Yang et al. |
| 2017/0252971 A1 | 9/2017 | Umebayashi |
| 2017/0321060 A1 | 11/2017 | Samantara et al. |
| 2021/0087315 A1* | 3/2021 | Miyakawa .......... C08F 222/102 |

FOREIGN PATENT DOCUMENTS

| | | |
|---|---|---|
| CN | 101689019 | 3/2010 |
| CN | 104345562 | 2/2015 |
| CN | 106956437 | 7/2017 |
| WO | 0020517 | 4/2000 |
| WO | 2005045523 | 5/2005 |
| WO | 2017192240 | 11/2017 |

OTHER PUBLICATIONS

Machine English translation of CN 106956437 (Year: 2017).*
International Search Report issued in connection with International Patent Application No. PCT/EP2019/056047 mailed on Jul. 3, 2019.
Bhattachargee et al. (Lab Chip, 2016,16, 1720-1742).

* cited by examiner

*Primary Examiner* — Jessica M Roswell
(74) *Attorney, Agent, or Firm* — Steven C. Bauman

(57) ABSTRACT

Methods for manufacturing three-dimensional articles having reduced surface haze, by applying a coating to the surface of a three-dimensional article made by additive manufacturing are described.

24 Claims, 1 Drawing Sheet

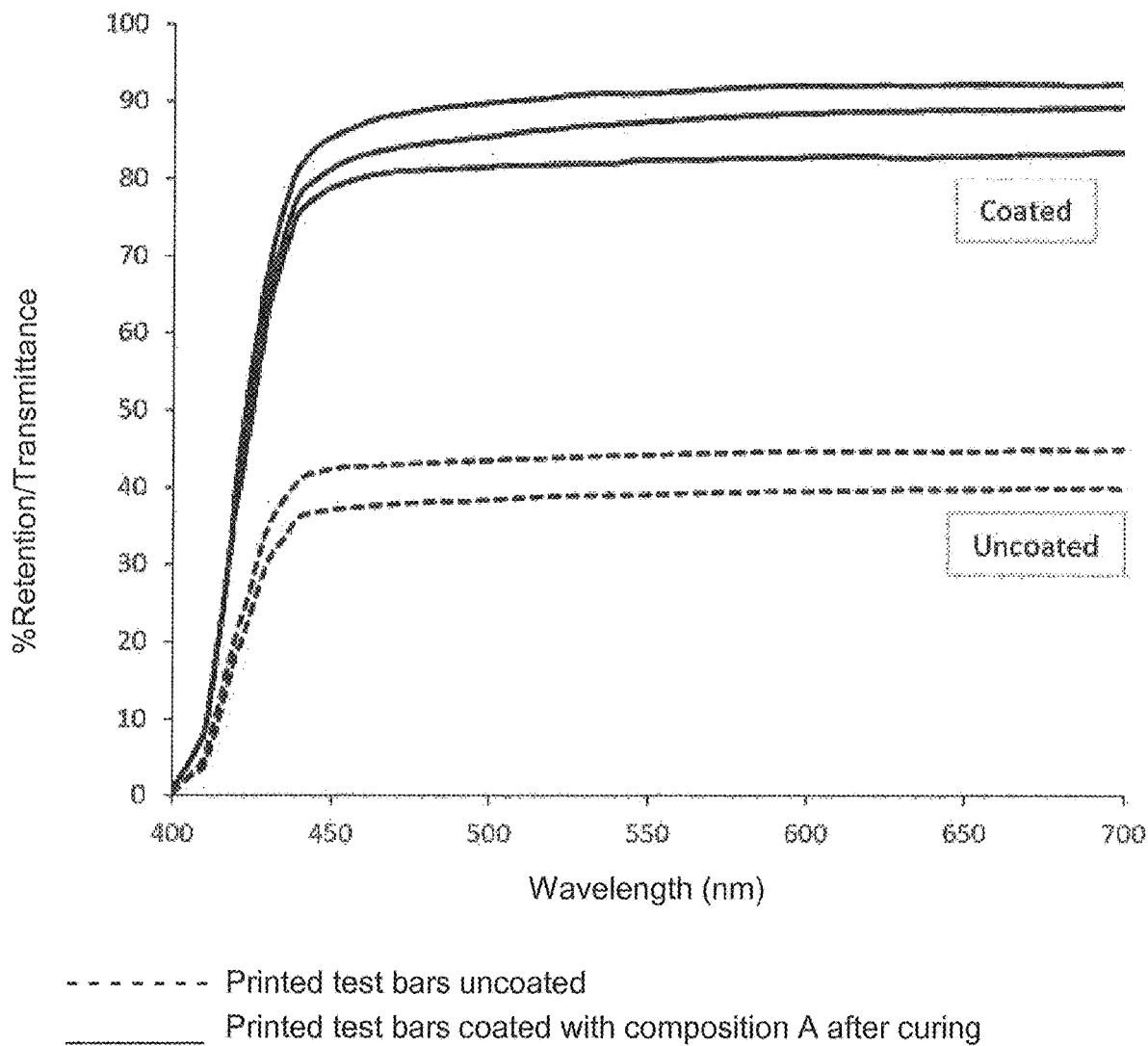

THREE-DIMENSIONAL ARTICLES MADE BY ADDITIVE MANUFACTURING HAVING REDUCED SURFACE HAZE

BACKGROUND

Field

Provided herein are methods for manufacturing three-dimensional articles having reduced surface haze, by applying a coating to the surface of a three-dimensional article made by additive manufacturing. Also provided herein are methods of reducing haze of three-dimensionally printed articles.

Brief Description of Related Technology

Additive manufacturing is fast becoming a viable alternative to traditional manufacturing techniques and in some cases the only practical alternative for making complex parts.

The ability to produce high clarity materials quickly and cost effectively is highly desirable. Additive manufacturing and three-dimensional printing in particular have become mainstream methods for developing prototypes efficiently. The manufacture of three-dimensional parts having high optical clarity remains a problem, since even when clear resins which do not contain colourants are employed to build articles via additive manufacturing, the curing of such resins can lead to colouration of the products. Furthermore, surface roughness leads to scattering of light and reduced transparency.

International Patent Application Publication No. WO2005045523 describes photocurable acrylate compositions for producing cured articles having high clarity and improved mechanical properties. WO'523 describes how three-dimensional articles produced by three-dimensional printing of hybrid compositions comprising both cationically curable and free radically curable compounds, tend to have low clarity and haziness and that such haziness is likely due in part to poor miscibility of the cationically curable and free radically curable compounds which is accentuated by different rates of reaction. WO'523 further notes that the use in three-dimensional printing of compositions comprising certain acrylates, vinyl ethers or photoacids tend to produce coloured articles. WO'523 describes a photocurable acrylate composition comprising an epoxy component and a methacrylate component further comprising a component comprising propoxylated glycerine, wherein from 0 to 20% by weight of the epoxy component is of glycidyl type.

Bhattachargee et al. (Lab Chip, 2016, 16, 1720-1742) describes how the clarity of a three-dimensional printed article not only depends on the composition of the resin used to prepare the article but also on the surface roughness of the article which causes dispersion and scatter of light, leading to haze and reduced transmittance through the article.

Accordingly, even an article manufactured using a colourless composition may suffer from surface roughness caused during additive manufacturing of said article. This surface roughness causes haze and reduces optical clarity of the article, and light transmittance through the article.

Several approaches have been developed to reduce surface roughness or haze, including modifying the compositions which are employed to manufacture the three-dimensional parts, polishing the surfaces of manufactured parts, and treating the surfaces of manufactured parts with transparent coatings.

While methodologies for reducing haze involving polishing surfaces using various grades of sandpaper and buffing have been developed, the degree of improvement in optical clarity of the article is limited. Furthermore, the ability to sand and polish surfaces which are difficult to access also poses a problem, for example, narrow channels in devices such as fluidic devices may prove challenging to access.

Treating the surfaces of three-dimensional articles manufactured by additive manufacturing with transparent coatings is also known, however, identifying coatings which can significantly improve transmittance through partially transparent materials without colouration of the article remains a desire.

WO0020517 relates to radiation-curable compositions comprising maleimide compounds and to methods of making and using such compositions. The compositions are suitable for use in filled compositions such as inks.

US2017113443 is concerned with a conductive film including a substrate, an electrically conductive layer disposed on the substrate, wherein the electrically conductive layer includes a plurality of nano-sized conductors and a protective layer disposed directly on the electrically conductive layer, wherein the protective layer includes a crosslinked polymer having a perfluorinated backbone, and it is postulated therein that the protective layer may enhance optical properties of the conductive film. By using a crosslinked polymer comprising a perfluorinated backbone an improvement of 3% in transmittance is reported.

Notwithstanding the state of the art it would be desirable to provide a method for increasing the light transmittance of an article comprising a light transmitting plastic substrate, which has surface haze as an artefact of its production by additive manufacturing, without colouring the article.

SUMMARY

In one aspect, the present invention provides a process for increasing light transmittance of a three-dimensional printed article comprising:
providing a three-dimensional printed article having a light transmittance in the range of from 20% to 55% when measured in the range of from 450 to 700 nm in accordance with ASTM D1003-13, said article having a first surface,
applying to the first surface a photocurable acrylate composition; and
curing the photocurable acrylate composition by exposure to radiation in the electromagnetic spectrum to form on the three-dimensional printed article a light transmitting coating,
thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance which is at least 10% greater than the light transmittance of the three-dimensional printed article prior to coating.

The three-dimensional printed article prior to coating, i.e. uncoated three-dimensional printed article, may have a light transmittance in the range of from 25% to 50%, for example the uncoated three-dimensional printed article may have a light transmittance of at least 25% and no more than 50% when measured in the range of from 450 to 700 nm in accordance with ASTM D1003-13. Suitably, the light transmittance may be from 25% to 45%, or from 30% to 45% or from 35% to 45% when measured in the range of from 450 to 700 nm in accordance with ASTM D1003-13.

The coated three-dimensional printed article may have a light transmittance in the range of from 65% to 98%, for example the coated three-dimensional printed article may have a light transmittance of at least 65% and no more than 98% when measured in the range of from 450 to 700 nm in accordance with ASTM D1003-13. Suitably, the light transmittance may be from 70% to 95%, or from 75% to 95% or from 80% to 90% when measured in the range of from 450 to 700 nm in accordance with ASTM D1003-13.

Suitably, the light transmittance of the coated three-dimensional printed article may be at least 50% greater than the light transmittance of the uncoated three-dimensional printed article. For example, the light transmittance of the coated three-dimensional printed article may be at least 60% greater such as 70% or 75% or 80% or 90% greater than the light transmittance of the three-dimensional printed article prior to coating.

The photocurable acrylate composition comprises (a) an aliphatic polyether urethane acrylate component, (b) a (meth)acrylate ester reactive monomer component, and (c) a photoinitiator component. Optionally, the photocurable acrylate composition further comprises a reactive diluent and/or an adhesion promoter.

The aliphatic polyether urethane acrylate component may be formed by reacting an aliphatic diisocyanate and a polyether polyol, at a ratio of about 2 or more isocyanate groups of the diisocyanate per hydroxyl group of the polyether polyol, and reacting the resulting product with a hydroxylakyl (meth)acrylate.

The aliphatic diisocyanate may be selected from isophorone diisocyanate, methylene-bis-cyclohexane diisocyanate and 1,6-hexane diisocyanate.

The hydroxy alkyl acrylates may be selected from hydroxyethyl acrylate, hydroxypropyl acrylate, hydroxybutyl acrylate, hydroxyethyl methacrylate, hydroxypropyl methacrylate, and hydroxybutyl methacrylate.

The aliphatic polyether urethane acrylate component may be an aliphatic polyether urethane acrylate component having an average of at least 2.5 acrylate groups per molecule.

The aliphatic polyether urethane acrylate is present in an amount of from about 10 wt % to about 30 wt % based on the total weight of the photocurable acrylate composition, desirably, in an amount of from about 18 wt % to about 28 wt % based on the total weight of the photocurable acrylate composition. Suitably, the aliphatic polyether urethane acrylate is present in an amount of from about 20 wt % to about 26 wt % based on the total weight of the photocurable acrylate composition.

The (meth)acrylate ester reactive monomer component may comprise at least one (meth)acrylate component selected from isobornyl acrylate, tetrahydrofurfuryl acrylate, 2-carboxyethyl acrylate, di(ethylene glycol) ethyl ether acrylate and a diacrylate ester.

The (meth)acrylate ester reactive monomer component may be present in an amount of from about 20 wt % to about 55 wt % based on the total weight of the photocurable composition, such as in an amount of from about 25 wt % to about 50 wt % based on the total weight of the photocurable composition. Desirably, the (meth)acrylate ester reactive monomer component may be present in an amount of from about 35 wt % to about 45 wt % based on the total weight of the photocurable composition.

The reactive diluent may be an unsaturated nitrogen-containing compound selected from N,N'-dimethylacrylamide, acryloyl morpholine, N-methyl-N-vinyl acetamide, N-vinyl caprolactam, N-vinylphthalimide, Uracil, and N-vinylpyrrolidone.

The reactive diluent is present in an amount of from about 15 wt % to about 27 wt % based on the total weight of the photocurable composition, such as from about 18 wt % to about 24 wt % based on the total weight of the photocurable composition.

The photocurable composition may comprise an adhesion promoter, selected from acrylic acid or methacrylic acid, glycidoxypropyltrimethoxysilane, methacryloxypropyltrimethoxysilane, methacryloxypropyltriacetoxysilane, and acryloxypropyltrimethoxysilane.

The photocurable composition may comprise an adhesion promoter which is present in an amount of from about 1 to about 10 wt % based on the total weight of the photocurable composition.

Advantageously, the application of such a photocurable acrylate composition and the curing of same on a surface of the three-dimensional printed article does not lead to colouration of the article. Unlike prior art coatings, the application of the photocurable acrylate composition as described herein, and the curing of same does not colour the product. Furthermore, the light transmittance through the coated three-dimensional printed article is significantly increased in comparison to the light transmittance through the uncoated three-dimensional printed article.

Suitably, the three-dimensional printed article may comprise a polymer formed by polymerisation of at least one (meth)acrylate monomer. The polymer may be formed from a photocurable acrylate composition comprising at least one (meth)acrylate monomer.

The at least one (meth)acrylate monomer may be selected from beta-carboxy ethyl acrylate, isobornyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexanediol diacrylate, (5-ethyl-1,3-dioxan-5-yl)methyl acrylate tripropylene glycol diacrylate, (octahydro-4,7-methano-1Hindenediyl)bis(methylene) diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate, trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, poly(ethylene glycol) methacrylate and mixtures thereof.

The photocurable acrylate composition may be cured to form the coating, for example by exposing the photocurable acrylate composition to light of wavelength 250 nm to 850 nm and having an intensity of from 25 mW/cm$^2$ to 150 mW/cm$^2$ for a period of from about 10 to about 180 seconds.

Suitably, curing the photocurable acrylate composition to form a coating may comprise exposing the photocurable acrylate composition to light of wavelength 300 to 450 nm and having an intensity of from 40 to 80 mW/cm$^2$ for a period of from about 15 to about 120 seconds, such as from about 15 to about 90 seconds, or from about 15 to about 30 seconds.

The photocurable acrylate composition may be applied by spraying, curtain coating, dip pad, roll-coating or brushing procedures.

In one embodiment, the present invention provides a process for increasing light transmittance of a three-dimensional printed article comprising:
providing a three-dimensional printed article having a light transmittance in the range of from 20% to 55% when measured in the range of from 450 to 700 nm in accordance with ASTM D1003-13, said article having a first surface, applying to the first surface a photocurable acrylate composition; and
curing the photocurable acrylate composition by exposure to radiation in the electromagnetic spectrum to form on the three-dimensional printed article a light transmitting coating,
thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance which is at least 10% greater than the light transmittance of the three-dimensional printed article prior to coating;
wherein the photocurable acrylate composition comprises (a) an aliphatic polyether urethane acrylate component, (b) a (meth)acrylate ester reactive monomer component; and (c) a photoinitiator;
wherein the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxylakyl (meth)acrylate.

In one embodiment, the present invention provides a process for increasing light transmittance of a three-dimensional printed article comprising:
providing a three-dimensional printed article having a light transmittance in the range of from 20% to 55% when measured in the range of from 450 to 700 nm in accordance with ASTM D1003-13, said article having a first surface, applying to the first surface a photocurable acrylate composition; and
curing the photocurable acrylate composition by exposure to radiation in the electromagnetic spectrum to form a on the three-dimensional printed article a light transmitting coating,
thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance which is at least 10% greater than the light transmittance of the three-dimensional printed article prior to coating;
where the photocurable acrylate composition comprises (a) an aliphatic polyether urethane acrylate component, (b) a (meth)acrylate ester reactive monomer component; (c) a photoinitiator; (d) a reactive diluent; and (e) an adhesion promoter;
where the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxylakyl (meth)acrylate;
said aliphatic urethane acrylate component being present in an amount of from about 18 wt % to about 28 wt %;
where the (meth)acrylate ester reactive monomer component comprises one or more of isobornyl acrylate, tetrahydrofurfuryl acrylate, 2-carboxyethyl acrylate, di(ethylene glycol) ethyl ether acrylate and a diacrylate ester,
said (meth)acrylate ester reactive monomer component being present in an amount of from about 35 wt % to about 45 wt % based on the total weight of the photocurable acrylate composition;
where the reactive diluent comprises one or more of N,N'-dimethylacrylamide, acryloyl morpholine, N-methyl-N-vinyl acetamide, N-vinyl caprolactam, N-vinylphthalimide, Uracil, and N-vinylpyrrolidone;
said reactive diluent being present in an amount of from about 15 wt % to about 25 wt % based on the total weight of the photocurable acrylate composition;
where the adhesion promoter comprises acrylic acid and a silane adhesion promoter, and where the acrylic acid is present in an amount of from about 1 wt % to about 10 wt %, and the silane adhesion promoter is present in an amount of from about 1 wt % to about 5 wt % based on the total weight of the photocurable composition.

The three-dimensional printed article may comprise a polymer formed by polymerisation of at least one (meth) acrylate monomer selected from beta-carboxy ethyl acrylate, isobornyl acrylate, cyclohexyl acrylate, tetrahydrofurfuryl acrylate, 2-ethylhexyl acrylate, ethoxyethoxyethyl acrylate, hydroxyethyl acrylate, hydroxypropyl acrylate, ethylene glycol diacrylate, diethylene glycol diacrylate, dipropylene glycol diacrylate, triethylene glycol diacrylate, tetraethylene glycol diacrylate, 1,6-hexane diol diacrylate, (5-ethyl-1,3-dioxan-5-yl)methyl acrylate tripropylene glycol diacrylate, (octahydro-4,7-methano-1Hindenediyl)bis(methylene) diacrylate, glycerol triacrylate, trimethylol propane diacrylate, trimethylol propane triacrylate, isobornyl methacrylate, trimethylolpropane trimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, poly(ethylene glycol) methacrylate.

Desirably, the three-dimensional printed article comprises a polymer comprises formed by polymerisation of at least one (meth)acrylate monomer selected from (5-ethyl-1,3-dioxan-5-yl)methyl acrylate tripropylene glycol diacrylate, (octahydro-4,7-methano-1Hindenediyl)bis(methylene), trimethylolpropane triacrylate and isobornyl methacrylate.

In another aspect, the present invention provides an article of manufacture comprising a light transmitting plastics substrate, where said light transmitting plastic substrate is a three-dimensional printed article, said three-dimensional printed article being at least partially coated with a photocurable acrylate composition which cures to form on the three-dimensional printed article a light transmitting coating, and the light transmittance through the coated substrate is at least 10% greater than light transmittance through the uncoated substrate.

Advantageously, the light transmittance through the cured coated substrate is at least 10% greater than light transmittance through the uncoated substrate.

In one aspect, the present invention provides:
an article of manufacture comprising a light transmitting plastics substrate, wherein said light transmitting plastic substrate is a three-dimensional printed article, said three-dimensional printed article being at least partially coated with a photocurable acrylate composition which cures to form on the three-dimensional printed article a light transmitting coating, wherein the light transmittance through the cured coated substrate is at least 10% greater than light transmittance through the uncoated substrate; wherein the photocurable acrylate composition comprises (a) an aliphatic polyether urethane acrylate component, (b) a (meth)acrylate ester reactive monomer component; and (c) a photoinitiator;

wherein the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxylakyl (meth)acrylate.

The uncoated substrate may have a light transmittance in the range of from 20% to 55% when measured in the range of from 450 to 700 nm in accordance with ASTM D1003-13.

The coated substrate may have a light transmittance in the range of from 60% to 98% when measured in the range of from 450 to 700 nm in accordance with ASTM D1003-13.

BRIEF DESCRIPTION OF THE DRAWING

Embodiments of the invention will be described, by way of example only, with reference to the accompanying drawing in which:

FIG. 1 shows the percentage transmittance through coated and uncoated three-dimensional printed articles, over the visible spectrum.

DETAILED DESCRIPTION

As noted above, a process for increasing light transmittance of a three-dimensional printed article is provided herein. The process includes the steps of:

providing a three-dimensional printed article having a light transmittance in the range of from 20% to 55% when measured in the range of from 450 to 700 nm in accordance with ASTM D1003-13, said article having a first surface, applying to the first surface a photocurable acrylate composition; and curing the photocurable acrylate composition to form on the three-dimensional printed article a light transmitting coating thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance of at least 10% greater than the three-dimensional printed article prior to coating.

The three-dimensional printed article may be formed according to known methods, for example, by curing a photocurable (meth)acrylate composition.

Composition

The photocurable acrylate composition, which cures to form on the three-dimensional printed article a light transmitting coating, may suitably comprise (a) an aliphatic polyether urethane acrylate component, (b) a (meth)acrylate ester reactive monomer component; and (c) a photoinitiator. Preferably, the photocurable acrylate composition comprises a reactive diluent. Optionally, the photocurable acrylate composition further comprises an adhesion promoter.

Component (a): Aliphatic Polyether Urethane Acrylate Component

The aliphatic polyether urethane acrylate compounds useful in the invention are suitably prepared by reacting an aliphatic diisocyanate with an aliphatic polyether polyol, at a ratio of about 2 or more isocyanate groups of the diisocyanate per hydroxyl group of the polyether polyol compound. The remaining isocyanate groups are then reacted with a suitable hydroxyalkyl (meth)acrylate compound to produce the acrylated oligomer. The reaction can also be run in reverse sequence, preparing acrylate functional isocyanate intermediates which are then used as capping agents for the polyether polyols. The polyether polyol has an average of at least 2.5 hydroxyl groups per molecule, typically 2.5-3.5 hydroxyl groups per molecule and preferably about 3 hydroxyl groups per molecule. The polyether repeat units may suitably be ethylene oxide ($-C_2H_4O-$), propylene oxide ($-C_3H_6O-$) or butylene oxide ($-C_4H_8O-$) repeat units, or mixtures thereof. In the foregoing, propylene includes n-propylene and isopropylene, and butylene includes 1,2-butylene, 1,3-butylene, 2-methyl-1,3-propylene and 1,4-butylene. Preferred polyols may be propoxylated glycerol or propoxylated trimethylolpropane.

Examples of suitable aliphatic diisocyanate include isophorone diisocyanate, methylene-bis-cyclohexane diisocyanate and 1,6-hexane diisocyanate. Examples of suitable hydroxy functional (meth)acrylate compounds include hydroxyethyl acrylate, hydroxypropyl acrylate and other diol monoacrylate esters.

The aliphatic polyether urethane acrylate compounds useful in the invention are suitably prepared by reacting an aliphatic diisocyanate with an aliphatic polyether polyol, at a ratio of about 2 or more isocyanate groups of the diisocyanate per hydroxyl group of the polyether polyol compound, and subsequently reacting with a hydroxyl functionalised acrylate compound.

The aliphatic diisocyanate may have the formula:

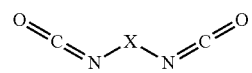

where X is a $C_4$ to C20 aliphatic group, for example a $C_6$ to $C_{16}$ aliphatic group.

For example, the aliphatic diisocyanate may be selected from isophorone diisocyanate, methylene-bis-cyclohexane diisocyanate and 1,6-hexane diisocyanate.

Non-limiting examples of polyether polyols include poly(oxyalkylene) polyols or polyalkoxylated polyols. Poly(oxyalkylene) polyols can be prepared in accordance with known methods. In a non-limiting embodiment, a poly(oxyalkylene) polyol can be prepared by condensing an alkylene oxide, or a mixture of alkylene oxides, using an acid- or base-catalyzed addition with a polyhydric initiator or a mixture of polyhydric initiators, such as ethylene glycol, propylene glycol, glycerol, and sorbitol. Compatible mixtures of polyether polyols can also be used. As used herein, "compatible" means that two or more materials are mutually soluble in each other so as to essentially form a single phase. Non-limiting examples of alkylene oxides can include ethylene oxide, propylene oxide, butylene oxide, amylene oxide, aralkylene oxides, such as styrene oxide, mixtures of ethylene oxide and propylene oxide. In some non-limiting embodiments, polyoxyalkylene polyols can be prepared with mixtures of alkylene oxide using random or step-wise oxyalkylation. Non-limiting examples of such poly(oxyalkylene) polyols include polyoxyethylene polyols, such as polyethylene glycol, and polyoxypropylene polyols, such as polypropylene glycol.

Other polyether polyols include block polymers such as those having blocks of ethylene oxide-propylene oxide and/or ethylene oxide-butylene oxide. In some non-limiting embodiments, the polyether polyol comprises a block copolymer of the following formula:

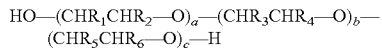

where $R_1$ through $R_6$ can each independently represent hydrogen or methyl; and a, b, and c can each be independently selected from an integer from 0 to 300, where a, b, and c are selected such that the number average molecular weight of the polyol is less than 32,000 grams/mole, or less than 10,000 grams/mole, as determined by GPC.

In some non-limiting embodiments, polyalkoxylated polyols can be represented by the following general formula:

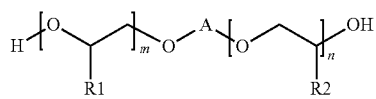

where m and n can each be a positive integer, the sum of m and n being from 5 to 70; $R_1$ and $R_2$ are each hydrogen, methyl or ethyl; and A is a divalent linking group such as a straight or branched chain alkylene which can contain from 1 to 8 carbon atoms, phenylene, and $C_1$ to $C_9$ alkyl-substituted phenylene. The values of m and n can, in combination with the selected divalent linking group, determine the molecular weight of the polyol. Polyalkoxylated polyols can be prepared by methods that are known in the art. In a non-limiting embodiment, a polyol such as 4,4'-isopropylidenediphenol can be reacted with an oxirane-containing material such as ethylene oxide, propylene oxide or butylene oxide, to form what is commonly referred to as an ethoxylated, propoxylated or butoxylated polyol having hydroxyl functionality.

In some non-limiting embodiments, the polyether polyol can be PLURONIC® ethylene oxide/propylene oxide block copolymers, such as PLURONIC® R and PLURONIC® L62D, and/or TETRONIC® tetra-functional block copolymers based on ethylene oxide and propylene oxide, such as TETRONIC® R, which are commercially available from BASF Corp.

As used herein, the phrase "polyether polyols" also can include poly(oxytetramethylene) diols prepared by the polymerization of tetrahydrofuran in the presence of Lewis acid catalysts such as, but not limited to boron trifluoride, tin (IV) chloride and sulfonyl chloride.

In some embodiments, non-limiting examples of suitable polyether polyols include poly(propylene oxide) diols, copoly(ethylene oxide-propylene oxide) diols, and poly(tetramethylene oxide) diols.

In some embodiments, the polyether polyol can be POLYMEG®2000 polytetramethylene ether glycol (linear diol having a backbone of repeating tetramethylene units connected by ether linkages and capped with primary hydroxyls having a molecular weight of 1900-2100 and a hydroxyl number of 53.0 to 59.0), commercially available from Lyondell.

In other embodiments, the polyether polyol can be TERATHANE® 1000 polytetramethylene ether glycol is a blend of linear diols in which the hydroxyl groups are separated by repeating tetramethylene ether groups: $HO(CH_2CH_2CH_2CH_2-O-)_nH$ in which n averages 14 and having a hydroxyl number of 107-118, commercially available from INVISTA, or POLYMEG®1000.

Suitably, the polyether polyol is propoxylated glycerol or propoxylated trimethylolpropane.

The hydroxyl alkyl acrylate may have the formula:

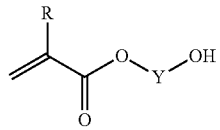

where Y is a $C_2$-$C_{20}$ aliphatic group optionally comprising one or more ether linkages, and further optionally substituted with one or more hydroxyl groups; and R is H or methyl.

Non-limiting examples of suitable hydroxy alkyl acrylates include hydroxyethyl acrylate, hydroxypropyl acrylate, hydroxybutyl acrylate, hydroxyethyl methacrylate, hydroxypropyl methacrylate, hydroxybutyl methacrylate and mixtures thereof. Other non-limiting examples of suitable hydroxy alkyl acrylates include 2-hydroxyethyl acrylate, 2-hydroxypropyl acrylate, 2- hydroxyethyl methacrylate, pentaerythritol triacrylate (PETA), and 4-hydroxybutyl acrylate.

The hydroxy functional acrylate compounds may include hydroxyethyl acrylate or hydroxypropyl acrylate.

Suitably, the aliphatic polyether urethane acrylate component is present in an amount of from about 10 wt % to about 50 wt % based on the total weight of the photocurable acrylate composition. Desirably, the aliphatic polyether urethane acrylate component may be present in an amount of from about 15 wt % to about 35 wt %, such as from about 20 wt % to about 30 wt % based on the total weight of the photocurable acrylate composition.

Component (b): (Meth)acrylate Ester Reactive Monomer Component

The (meth)acrylate ester reactive monomer component may comprise at least one (meth)acrylate ester selected from beta-carboxy ethyl acrylate, isobornyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, and poly(ethylene glycol) methacrylate.

Suitably, the (meth)acrylate ester reactive monomer component comprises at least one (meth)acrylate component selected from isobornyl acrylate, tetrahydrofurfuryl acrylate, 2-carboxyethyl acrylate, di(ethylene glycol) ethyl ether acrylate and a diacrylate ester.

The (meth)acrylate ester reactive monomer component may be present in an amount of from about 10 wt % to about 80 wt % based on the total amount of photocurable compostion, suitably, the (meth)acrylate ester reactive monomer component is present in an amount of from about 20 wt % to about about 55 wt %, desirably from about 25 wt % to about 50 wt %, such as from about 30 wt % to about 45 wt % based on the total weight of photocurable acrylate composition.

Component (c): Photoinitiator

One or more free radical photoinitiators can be included in the radiation curable composition. Suitable photoinitiators are active in the UV/visible range, approximately 250-850 nm, or some segment thereof. More suitably, the photoinitiators used in the present invention are active in the UV/visible range, approximately 250-850 nm, and preferably in the range of 300 to 450 nm so that the compositions can be cured by exposure to low intensity UV. Examples of photoinitiators, which initiate under a free radical mechanism, include benzoyl peroxide, benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphonates, ketosulfides, dibenzoyldisulphides, diphenyldithiocarbonate and diphenyl(2,4,6-trimethylbenzoyl) phosphine oxide. Other examples of photoinitiators that may be used in the photocurable compositions of the present invention include photoinitiators available commercially from Ciba Specialty Chemicals, Tarrytown, N.Y., under the IRGACURE and DAROCUR tradenames, for example IRGACURE 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl phosphine oxide and 2-hydroxy-2-methyl-1-phenyl-propan-1-one) and DAROCUR 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and IRGACURE 784DC, or mixtures thereof.

In some embodiments, the photoinitiator comprises IRGACURE 2959 (1[4-(2-hydroxyethoxy)-phenyl]-2-hydroxy-2-methyl-1-propane-1-one). In some embodiments, the photoinitiator comprises DAROCUR 4265, which consists of 50 wt % of DAROCUR TPO (diphenyl (2,4,6-trimethylbenzoyl) phosphine oxide) and 50 wt % of DAROCUR 1173 (2-hydroxy-2-methyl-1-phenyl-1-propanone), and which is commercially available from Ciba Specialty Chemicals.

Other useful photoinitiators include ultraviolet photoinitiators, such as 2,2-dimethoxy-2-phenyl acetophenone (e.g., IRGACURE 651), and 2-hydroxy-2-methyl-1-phenyl-1-propane (e.g., DAROCUR 1173) and the ultraviolet/visible photoinitiator combination of bis(2,6-dimethoxybenzoyl-2,4,4-trimethylpentyl)phosphine oxide and 2-hydroxy-2-methyl-1-phenyl-propan-1-one (e.g., IRGACURE 1700), as well as the visible photoinitiator bis($\eta$<5>-2,4-cyclopentadien-1-yl)-bis[2,6-difluoro-3-(1H-pyrrol-1- yl)phenyl]titanium (e.g., IRGACURE 784DC). LUCIRIN TPO, from BASF is another useful photoinitiator. Typically, the photoinitiators can be used in an amount of 0.05 to 5 weight percent, or 0.5 to 5 weight percent of the composition.

Suitably, the composition has a viscosity in the range of from about 50 cP to about 450 cP when measured at 25° C., for example, about 100 cP to about 450 cP when measured at 25° C., preferably the composition has a viscosity in the range of from about 200 cP to about 450 cP when measured at 25° C.

Viscosity may be measured using a Brookfield RTV Viscometer having a #2 spindle at 20 rpm and 25° C.

Adhesion Promoter

Various adhesion promoters may be used in the photocurable acrylate curable compositions of the invention. Adhesion promoters may include acid functional monomers such as acrylic acid or methacrylic acid, and silane adhesion promoters. Preferably, the photocurable acrylate composition comprises acrylic acid.

The silane adhesion promoters are silane or small siloxane oligomers which contain two or more hydrolyzable groups attached to silicon and at least one organic group which is a polar group and/or free-radically polymerizable. Examples of hydrolyzable groups are alkoxy groups such as methoxy or ethoxy groups, oximes, acetoxy groups, and amino groups. Examples of organic groups which are polar groups and/or free-radically polymerizable include vinyl, allyl, methacryloxypropyl, acryloxypropyl, glycidoxyethyl, glycidoxypropyl, mercaptopropyl, epoxycyclohexyl, haloalkyl, and alkyl groups having ketone, aldehyde, carboxylate, carboxylic acid, ureide, amide, or isocyanurate groups thereon. Specific examples of such compounds include glycidoxypropyltrimethoxysilane, methacryloxypropyltrimethoxysilane, methacryloxypropyltriacetoxysilane, and acryloxypropyltrimethoxysilane.

The adhesion promoter may be present in an amount of from about 0.5 wt % to about 30 wt % based on the total weight of the photocurable acrylate composition, preferably in an amount of from about 1 to about 10 wt %.

Suitably, the adhesion promoter comprises acrylic acid in an amount of from about 1 to about 10 wt % and a silane adhesion promoter in an amount of from about 1 to about 5 wt %, based on the total weight of the photocurable acrylate composition.

Reactive Diluent

The photocurable acrylate compositions of the present invention also may include a reactive diluent. A variety of reactive diluents may be employed, such as, unsaturated nitrogen-containing compounds for example N,N'-dimethylacrylamide, acryloyl morpholine, N-methyl-N-vinyl acetamide, N-vinyl caprolactam, N-vinylphthalimide, Uracil, and N-vinylpyrrolidone. Preferably, the photocurable acrylate composition comprises N,N'-dimethylacrylamide.

Reactive diluents may be present in an amount from about 1 wt % to about 30 wt % by weight in the final composition (w/w). Desirably, reactive diluents are present in an amount from about 15 wt % to about 27 wt % (w/w), and more desirably about 18 wt % to about 25 wt % (w/w).

Stabiliser

The compositions of the invention may also include an inhibitor of polymerization (i.e. a stabiliser) in an amount effective to give desired shelf stability to the composition. Suitable inhibitors are well known to those skilled in the art. Metal chelators, such as ethylenediamine tetraacetate ("EDTA") and 1-hydroxyethylidine-1,1-diphosphonic acid ("HEDPA"), and quinone type inhibitors, such as hydroquinone, methyl hydroquinone, napthaquinone and benzoquinone, are exemplary. Such stabilisers are typically employed at a level of 0.1-1.0 wt % by weight of the composition.

Photocurable Acrylate Composition

In one embodiment, the photocurable acrylate composition comprises:
(a) an aliphatic polyether urethane acrylate component,
  where the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxylakyl (meth)acrylate;
  where said aliphatic diisocyanate has the formula:

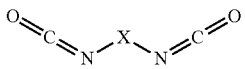

where X is a $C_4$ to $C_{20}$ aliphatic group, for example a $C_6$ to $C_{16}$ aliphatic group,
  and where the hydroxyl alkyl acrylate may have the formula:

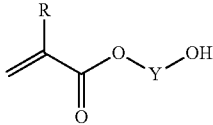

where Y is a $C_2$-$C_{20}$ aliphatic group optionally comprising one or more ether linkages, and
  further optionally substituted with one or more hydroxyl groups; and R is H or methyl;
(b) a (meth)acrylate ester reactive monomer component;
  where the (meth)acrylate ester reactive monomer component comprises one or more of isobornyl acrylate, tetrahydrofurfuryl acrylate, 2-carboxyethyl acrylate, di(ethylene glycol) ethyl ether acrylate and a diacrylate ester
(c) a photoinitiator;
(d) a reactive diluent;
  where said reactive diluent comprises N,N'-dimethylacrylamide; and
(e) an adhesion promoter;
  where said adhesion promoter comprises acrylic acid and a silane adhesion promoter.

Desirably, the aliphatic polyether urethane acrylate component is present in an amount of from about 18 wt % to about 28 wt %, the (meth)acrylate ester reactive monomer component is present in an amount of from about 35 wt % to about 45 wt %, the reactive diluent is present in an amount of from about 15 wt % to about 24 wt % and the adhesion promoter is present in an amount of from about 1 wt % to about 10 wt % based on the total weight of the photocurable acrylate composition.

Suitably, the photocurable acrylate composition may be cured to form a coating by exposing the photocurable acrylate composition to light of wavelength 300 nm to 450 nm and having an intensity of from 40 mW/cm$^2$ to 80 mW/cm$^2$ for a period of from 15 to 120 seconds, such as from 15 to 90 seconds, or from 15 to 30 seconds.

Advantageously, use of such photocurable acrylate compositions in the process of the present invention to coat a three-dimensional printed article increases the light transmittance through the three-dimensional printed article by greater than 50%.

Such compositions are particularly suited for coating three-dimensional printed articles which comprise a polymer formed by polymerisation of at least one (meth)acrylate monomer selected from (5-ethyl-1,3-dioxan-5-yl)methyl acrylate tripropylene glycol diacrylate, (octahydro-4,7-methano-1Hindenediyl)bis(methylene), trimethylolpropane triacrylate and isobornyl methacrylate.

Uncoated Three-Dimensional Printed Article

The uncoated three-dimensional printed article comprises a plastic substrate having a light transmittance in the range of from 20% to 55% when measured in the range of from 450 to 700 nm in accordance with ASTM D1003-13.

Suitably, the uncoated three-dimensional article comprises a plastic substrate having a light transmittance of from at least 20% to no more than 55% when measured in the range of from 450 to 700 nm in accordance with ASTM D1003-13. For example the light transmittance may have a lower limit of 25%, for example 28% or 30% or 32% or 35% or 37%; and the light transmittance may have an upper limit of no more than 50% for example 48% or 45% or 42% or 40%, when measured in the range of from 450 to 700 nm in accordance with ASTM D1003-13.

The uncoated three-dimensional printed article may be manufactured in accordance with standard methods.

The uncoated three-dimensional printed article may be formed from a plastic material having the appropriate transmittance. For example, the three-dimensional printed article may comprise a polymer formed by polymerisation of at least one (meth)acrylate monomer.

The at least one (meth)acrylate monomer may be selected from beta-carboxy ethyl acrylate, isobornyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, poly(ethylene glycol) methacrylate and mixtures thereof.

The uncoated three-dimensional printed article may be formed of a polymer formed from a radiation curable (meth)acrylate composition.

Suitably, the uncoated three-dimensional printed article may be formed from a photocurable composition, such as a photocurable (meth)acrylate composition.

More suitably, the uncoated three-dimensional printed article may be formed from a photocurable (meth)acrylate composition comprising one or more of (5-ethyl-1,3-dioxan-5-yl)methyl acrylate tripropylene glycol diacrylate, (Octahydro-4,7-methano-1Hindenediyl)bis(methylene), trimethylolpropane triacrylate and isobornyl methacrylate.

Suitably commercial sources of (meth)acrylate compositions for forming the three-dimensional printed article include for example, Loctite®3830 and Loctite®3840.

Coated Three-Dimensional Printed Article

The coated three-dimensional printed article has a light transmittance in the range of from 60% to 98% when measured in the range of from 450 to 700 nm in accordance with ASTM D1003-13. Suitably, the coated three-dimensional article comprises a plastic substrate having a light transmittance of from at least 60% to no more than 98% when measured in the range of from 450 to 700 nm in accordance with ASTM D1003-13. For example the light transmittance may have a lower limit of 60%, for example 65% or 68% or 70% or 75% or 78% or 80%; and the light transmittance may have an upper limit of no more than 98% for example 95% or 92% or 90% or 88% or 85% when measured in the range of from 450 to 700 nm in accordance with ASTM D1003-13.

EXAMPLES

Viscosity was measured using a Brookfield RTV Viscometer having a #2 spindle at 20 rpm and 25° C.

Transmittance in the range of from 450 to 700 nm was measured in accordance with ASTM D1003-13.

Photocurable Acrylate Composition

The photocurable acrylate composition may have the following components, said components may be mixed together to form the photocurable acrylate composition:

| Photocurable acrylate composition | |
|---|---|
| Component | Amount (wt %) |
| Aliphatic polyether urethane acrylate | 10-30 |
| Reactive diluent | 10-30 |
| (meth)acrylate ester | 20-55 |
| Adhesion promoter | 1-10 |
| Photoinitiator | 0.1-5 |

Composition A is a photocurable acrylate composition comprising (a) an aliphatic polyether urethane acrylate component, (b) a (meth)acrylate ester reactive monomer component; and (c) a photoinitiator, (d) a reactive diluent and (e) an adhesion promoter, which was formed by mixing together the following components:

| Composition A | |
|---|---|
| Component | Amount (wt %) |
| Aliphatic polyether urethane acrylate | 25 |
| N,N-dimethyl acrylamide | 20 |
| (meth)acrylate ester | 42 |
| Adhesion promoter | 9 |
| Photoinitiator | 4 |

The exemplified composition, Composition A, comprises a mixture of (meth)acrylate components including di(ethylene glycol)ethyl ether acrylate and a diacrylate ester.

The adhesion promoter employed was an adhesion promoter as described above comprising acrylic acid, acrylic acid oligomers and a silane.

The photoinitiator employed was a photoinitiator as described above comprising diphenyl(2,4,6-trimethylbenzoyl) phosphine oxide.

The composition had a viscosity in the range of from 200 cP to 450 cP when measured at 25° C.

Three-Dimensional Printed Test Bar Manufacture

First test bars suitable for insertion into the cuvette receiver of a UV/Vis spectrophotometer were manufactured. Test bars having the following dimensions were manufactured by three-dimensional printing:

4.4 mm×12.7 mm×63.5 mm

The test bars were printed using a (meth)acrylate composition available commercially from Henkel, called Loctite® 3840 which comprises:

| Component | Amount (wt %) |
|---|---|
| (5-ethyl-1,3-dioxan-5-yl)methyl acrylate | 40-50 |
| (Octahydro-4,7-methano-1Hindenediyl)bis(methylene) diacrylate | 20-30 |
| polyurethane acrylate | 5-10 |
| Tricyclodecanedimethanol, polymer with a-hydro-w-hydroxypoly(oxy-1,4-butanediyl) and 5-isocyanato-1-(isocyanatomethyl)-1,3,3-trimeth | 1-5 |
| 5-Ethyl-1,3-dioxane-5-methanol | 1-5 |
| Trimethylolpropane triacrylate | 1-5 |
| Isobornyl methacrylate | 1-5 |
| Diphenyl-2,4,4-trimethylbenzoyl phosphine oxide | 0.1-1 |

The test bar was printed using the above-identified composition and a desktop SLA printer. Once printing was complete the bar was set standing to allow excess liquid flow therefrom. The bar was then cleaned by immersion in isopropyl alcohol and sonicated for 5 minutes. The test bar was then removed from the sonicator and allowed to dry.

Once a test bar was manufactured the transmittance of light having a wavelength of from 450 to 700 nm through the test bar was measured.

The three-dimensional printed articles had a light transmittance in the range of from 20% to 55% when measured in the range of from 450 to 700 nm in accordance with ASTM D1003-13.

Coated Three-Dimensional Printed Test Bar Manufacture

To a three-dimensional printed test bar was applied photocurable composition A. The photocurable acrylate composition may be applied for example by brushing, dip coating, or spraying. In the present example, the composition was applied using a pipette dispenser to both major surfaces of the three-dimensional printed test bar, to provide a three-dimensional printed test bar coated with an uncured photocurable composition.

A film of polyester was placed on top of each of the major surfaces of the test bar coated with the uncured photocurable composition, taking care to avoid air bubble entrapment. The test bar was then placed in an LED cure chamber. A Loctite® EQ CL30 flood system was employed to cure the photocurable composition. The composition was irradiated at 405 nm using 50 mW/cm$^2$ for 20 seconds. The photocurable composition was cured to provide a coated three-dimensional printed test bar.

Transmittance of the coated three-dimensional printed test bar was measured. The coated three-dimensional printed test bars had transmittance of 60% to 98% when measured in the range of from 450 to 700 nm in accordance with ASTM D1003-13.

The transmittance of coated three-dimensional printed test bars versus uncoated three-dimensional test bars was plotted as shown in FIG. 1. The coated three-dimensional printed test bars demonstrated a significant increase in transmittance in comparison to the uncoated three-dimensional printed test bars. The transmittance of the coated three-dimensional printed test bars shown in FIG. 1 was approximately 80% to 95% when measured in the range of from 450 to 700 nm in accordance with ASTM D1003-13.

Advantageously, transmittance through test bars coated with photocurable acrylate composition A approximately doubled.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A process for increasing light transmittance of a three-dimensional printed article comprising:
providing a three-dimensional printed article having a light transmittance in the range of from 20% to 55% when measured in the range of from 450 to 700 nm in accordance with ASTM D1003-13, said article having a first surface,
applying to the first surface a photocurable acrylate composition; and
curing the photocurable acrylate composition by exposure to radiation in the electromagnetic spectrum to form on the three-dimensional printed article a light transmitting coating,
thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance which is at least 10% greater than the light transmittance of the three-dimensional printed article prior to coating.

2. The process as claimed in claim 1, wherein the three-dimensional printed article has a light transmittance in the range of from 25% to 50% when measured in the range of from 450 to 700 nm in accordance with ASTM D1003-13.

3. The process as claimed in claim 1, wherein the coated three-dimensional printed article has a light transmittance in the range of from 65% to 95% when measured in the range of from 450 to 700 nm in accordance with ASTM D1003-13.

4. The process as claimed in claim 1, wherein the photocurable acrylate composition comprises (a) an aliphatic polyether urethane acrylate component, (b) a (meth)acrylate ester reactive monomer component; and (c) a photoinitiator.

5. The process as claimed in claim 4, wherein the photocurable acrylate composition further comprising a reactive diluent and/or an adhesion promoter.

6. The process as claimed in claim 4, wherein the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxyalkyl (meth)acrylate.

7. The process as claimed in claim 6, wherein the aliphatic diisocyanate is selected from the group consisting of isophorone diisocyanate, methylene-bis-cyclohexane diisocyanate and 1,6-hexane diisocyanate.

8. The process as claimed in claim 6, wherein the hydroxy alkyl acrylates is selected from the group consisting of hydroxyethyl acrylate, hydroxypropyl acrylate, hydroxybutyl acrylate, hydroxyethyl methacrylate, hydroxypropyl methacrylate, and hydroxybutyl methacrylate.

9. The process as claimed in claim 4, wherein the aliphatic polyether urethane acrylate is present in an amount of from about 10 wt % to about 30 wt % based on the total weight of the photocurable acrylate composition based on the total weight of the photocurable acrylate composition.

10. The process as claimed in claim 6, wherein the (meth)acrylate ester reactive monomer component comprises one or more of isobornyl (meth) acrylate, tetrahydrofurfuryl acrylate, 2-carboxyethyl acrylate, di(ethylene glycol) ethyl ether acrylate and a diacrylate ester.

11. The process as claimed in claim 6, wherein the (meth) acrylate ester reactive monomer component is present in an amount of from about 20 wt % to about 55 wt % based on the total weight of the photocurable composition.

12. The process as claimed in claim 5, wherein the reactive diluent is an unsaturated nitrogen-containing compounds selected from the group consisting of N, N'-dimethylacrylamide, acryloyl morpholine, N-methyl-N-vinyl acetamide, N-vinyl caprolactam, N-vinylphthalimide, Uracil, and N-vinylpyrrolidone.

13. The process as claimed in claim 5, wherein the reactive diluent is present in an amount of from about 15 wt % to about 27 wt % based on the total weight of the photocurable composition.

14. The process as claimed in claim 5, wherein the photocurable composition comprises an adhesion promoter, selected from the group consisting of acrylic acid or methacrylic acid, glycidoxypropyltrimethoxysilane, methacryloxypropyltrimethoxysilane, methacryloxypropyltriacetoxysilane, and acryloxypropyltrimethoxysilane.

15. The process as claimed in claim 5, wherein the photocurable composition comprises an adhesion promoter which is present in an amount of from about 1 to about 10 wt % based on the total weight of the photocurable composition.

16. The process as claimed in claim 1 wherein the three-dimensional printed article comprises a polymer formed by polymerisation of at least one (meth) acrylate monomer.

17. The process as claimed in claim 16, wherein the at least one (meth) acrylate monomer is selected from the group consisting of beta-carboxy ethyl acrylate, isobornyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl. acrylate, isooctyl acrylate, n-butyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexanediol diacrylate, (5-ethyl-1, 3-dioxan-5-yl)methyl acrylate tripropylene glycol diacrylate, (octahydro-4, 7-methano-1Hindenediyl) bis (methylene) diacrylate, glycerol triacrylate, trimethylol propane diacrylate, trimethylol propane triacrylate, pentaerythritol tetraacrylate, phenoxyethyl acrylate, hydroxyethyl methacrylate, hydroxypropyl methacrylate, cyclohexyl methacrylate, glycerol monomethacrylate, glycerol 1,3-dimethacrylate, trimethyl cyclohexyl methacrylate, methyl triglycol methacrylate, isobornyl methacrylate, trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, poly (ethylene glycol) methacrylate and mixtures thereof.

18. The process as claimed in claim 1, wherein curing the photocurable acrylate composition to form a coating, comprises exposing the photocurable acrylate composition to light of wavelength 250 nm to 850 nm and having an intensity of from 25 mW/cm$^2$ to 150 mW/cm$^2$ for a period of from about 10 to about 180 seconds.

19. The process as claimed in claim 18, wherein curing the photocurable acrylate composition to form a coating comprises exposing the photocurable acrylate composition to light of wavelength 300 nm to 450 nm and having an intensity of from 40 mW/cm$^2$ to 80 mW/cm$^2$ for a period of from about 15 to about 120 seconds.

20. The process as claimed in claim 1, wherein the photocurable acrylate composition is applied to the three-dimensional printed article by spraying, curtain coating, dip pad, roll-coating or brushing procedures.

21. A process for increasing light transmittance of a three-dimensional printed article comprising:
providing a three-dimensional printed article having a light transmittance in the range of from 20% to 55% when measured in the range of from 450 to 700 nm in accordance with ASTM D1003-13, said article having a first surface,
applying to the first surface a photocurable acrylate composition; and
curing the photocurable acrylate composition by exposure to radiation in the electromagnetic spectrum to form on the three-dimensional printed article a light transmitting coating,
thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance which is at least 10% greater than the light transmittance of the three-dimensional printed article prior to coating;
wherein the photocurable acrylate composition comprises (a) an aliphatic polyether urethane acrylate component, (b) a (meth)acrylate ester reactive monomer component; and (c) a photoinitiator;
wherein the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxyalkyl (meth) acrylate.

22. A process for increasing light transmittance of a three-dimensional printed article comprising:
providing a three-dimensional printed article having a light transmittance in the range of from 20% to 55% when measured in the range of from 450 to 700 nm in accordance with ASTM D1003-13, said article having a first surface,
applying to the first surface a photocurable acrylate composition; and
curing the photocurable acrylate composition by exposure to radiation in the electromagnetic spectrum to form on the three-dimensional printed article a light transmitting coating, thereby forming a coated three-dimensional printed article having a light transmittance in the range of from 60% to 98% when measured in the range of from 450 to 700 nm in accordance with ASTM D1003-13 and/or a coated three-dimensional printed article having a light transmittance which is at least 10% greater than the light transmittance of the three-dimensional printed article prior to coating;
wherein the photocurable acrylate composition comprises (a) an aliphatic polyether urethane acrylate component, (b) a (meth)acrylate ester reactive monomer component; (c) a photoinitiator; (d) a reactive diluent; and (e) an adhesion promoter;
wherein the aliphatic polyether urethane acrylate component is formed by reacting an aliphatic diisocyanate and a polyether polyol, at a ratio of about 2 or more isocyanate groups of the diisocyanate per hydroxyl group of the polyether polyol, and reacting the resulting product with a hydroxyalkyl (meth) acrylate;
said aliphatic urethane acrylate component being present in an amount of from about 18 wt % to about 28 wt %;
wherein the (meth) acrylate ester reactive monomer component comprises one or more of isobornyl acrylate, tetrahydrofurfuryl acrylate, 2-carboxyethyl acrylate, di(ethylene glycol) ethyl ether acrylate and a diacrylate ester,
said (meth) acrylate ester reactive monomer component being present in an amount of from about 35 wt % to about 45 wt % based on the total weight of the photocurable acrylate composition;
wherein the reactive diluent comprises one or more of N, N'-dimethylacrylamide, acryloyl morpholine, N-methyl-N-vinyl acetamide, N-vinyl caprolactam, N-vinylphthalimide, Uracil, and N-vinylpyrrolidone;
said reactive diluent being present in an amount of from about 15 wt % to about 25 wt % based on the total weight of the photocurable acrylate composition;
wherein the adhesion promoter comprises acrylic acid and a silane adhesion promoter, and wherein the acrylic acid is present in an amount of from about 1 wt % to about 10 wt %, and the silane adhesion promoter is present in an amount of from about 1 wt % to about 5 wt % based on the total weight of the photocurable composition.

23. The process of claim 21, wherein the three-dimensional printed article comprises a polymer formed by polymerisation of at least one (meth) acrylate monomer selected from the group consisting of beta-carboxy ethyl acrylate, isobornyl acrylate, cyclohexyl acrylate, tetrahydrofurfuryl acrylate, 2-ethylhexyl acrylate, ethoxyethoxyethyl acrylate, hydroxyethyl acrylate, hydroxypropyl acrylate, ethylene glycol diacrylate, diethylene glycol diacrylate, dipropylene glycol diacrylate, triethylene glycol diacrylate, tetraethylene glycol diacrylate, 1,6-hexane diol diacrylate, (5-ethyl-1,3-dioxan-5-yl) methyl acrylate tripropylene glycol diacrylate, (octahydro-4,7-methano-1Hindenediyl) bis (methylene) diacrylate, glycerol triacrylate, trimethylol propane diacrylate, trimethylol propane triacrylate, isobornyl methacrylate, trimethylolpropane trimethacrylate, ethylene glycol dimethacrylate, diethylene glycol dimethacrylate, 1,6-hexanediol dimethacrylate, hydroxybutyl methacrylate, tetrahydrofurfuryl methacrylate, cyclohexyl methacrylate, phenoxyethyl methacrylate, poly (ethylene glycol) methacrylate.

24. The process of claim 23, wherein the three-dimensional printed article comprises a polymer formed by polymerisation of at least one (meth) acrylate monomer selected from the group consisting of (5-ethyl-1,3-dioxan-5-yl)methyl acrylate tripropylene glycol diacrylate, (octahydro-4,7-methano-1Hindenediyl) bis (methylene), trimethylolpropane triacrylate and isobornyl methacrylate.

* * * * *